United States Patent

[11] 3,619,553

[72] Inventors Gunter Wilkens
Kelkheim/Taunus;
Werner Becker, Frankfurt/Main, both of Germany
[21] Appl. No. 816,948
[22] Filed Apr. 17, 1969
[45] Patented Nov. 9, 1971
[73] Assignee Messer Griesheim GmbH
Frankfurt/Main, Germany
[32] Priority Apr. 20, 1968
[33] Germany
[31] P 17 65 224.3

[54] REMOTELY DISPOSABLE ADVANCE AND SUPPLY UNITS FOR ARC WELDING
10 Claims, 6 Drawing Figs.

[52] U.S. Cl. .................................................. 219/130, 219/136
[51] Int. Cl. .................................................. B23k 9/00
[50] Field of Search ........................................... 219/130, 136; 314/69

[56] References Cited
UNITED STATES PATENTS

| | | | |
|---|---|---|---|
| 3,217,136 | 11/1965 | Anderson ..................... | 219/130 |
| 3,242,310 | 3/1966 | Bosteels ....................... | 219/130 |
| 3,263,060 | 7/1966 | Bosteels ....................... | 219/130 |
| 2,606,267 | 8/1952 | McElrath, Jr. ................ | 219/130 |
| 2,719,245 | 9/1955 | Anderson ..................... | 219/130 X |
| 2,833,912 | 5/1958 | Royer ........................... | 219/130 |
| 3,239,120 | 3/1966 | Bosteels ....................... | 219/130 X |
| 3,293,477 | 12/1966 | Cobosco....................... | 219/130 X |
| 3,344,305 | 9/1965 | Ogden et al................... | 219/130 X |

*Primary Examiner*—J. V. Truhe
*Assistant Examiner*—George A. Montanye
*Attorney*—Connolly and Hutz

ABSTRACT: An electric arc welding device utilizes a current source housing, a wire storage device and a wire advance device. The wire storage and advance devices are mounted in such a manner that they can be either within or outside the current source housing.

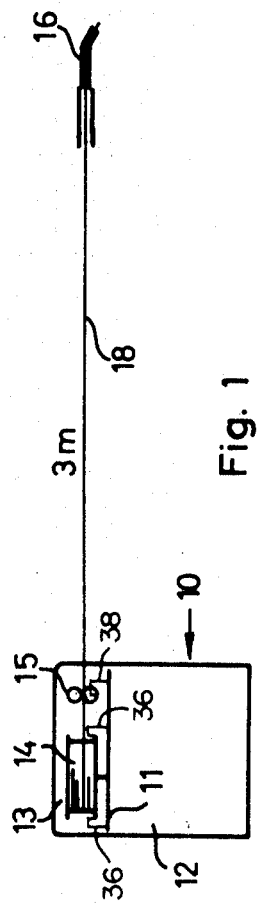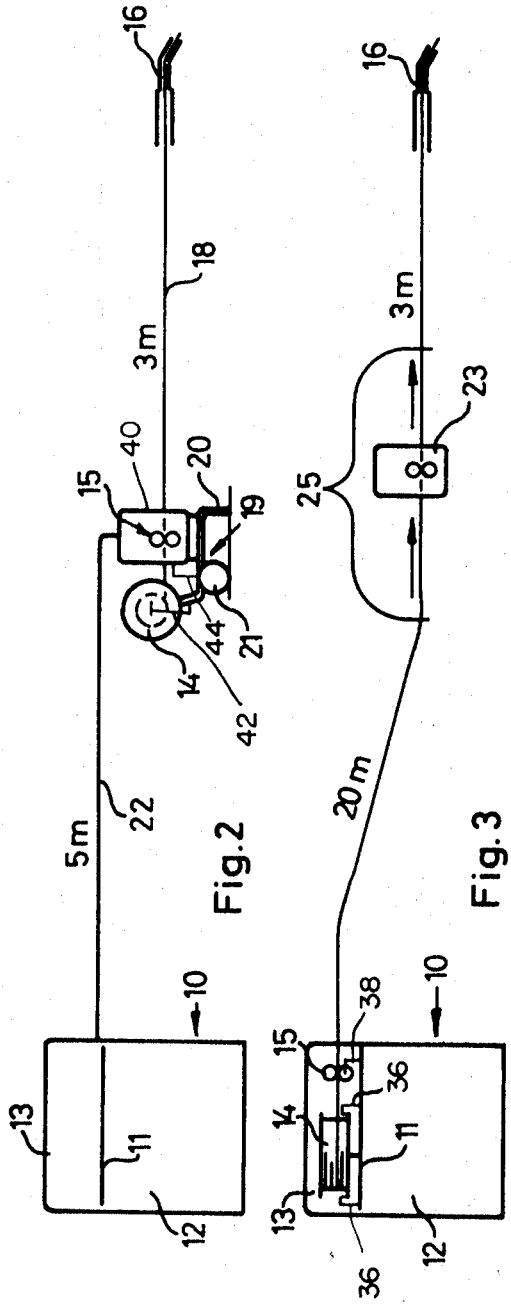

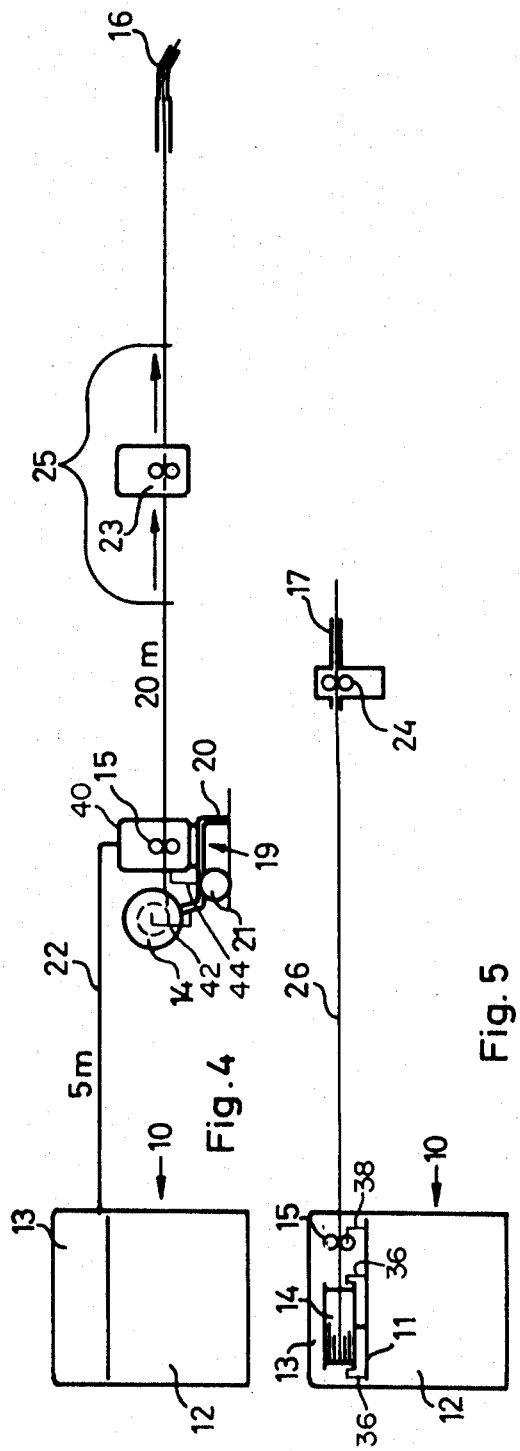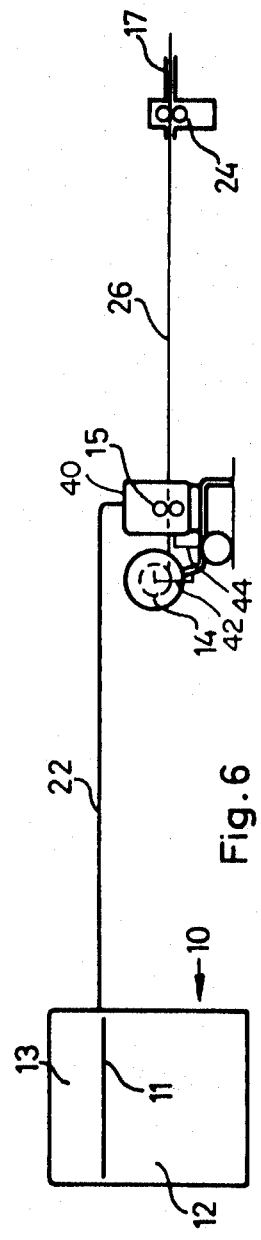

REMOTELY DISPOSABLE ADVANCE AND SUPPLY UNITS FOR ARC WELDING

BACKGROUND OF INVENTION

This invention relates to a device for electric arc welding with a current source, a wire storage device or reel and a wire advance device.

Welding devices are known where both the wire storage device (wire reel) as well as the wire advance device are arranged within the current source. Such a device is suitable only for stationary operation, since the advance apparatus can conduct the wire only over about 3 m. of hose length. Furthermore, apparatus are known wherein the wire reel and wire advance are located outside the current source. Such apparatus are suitable more for movable use; in stationary operation, however, they have the disadvantage of requiring much space.

SUMMARY OF THE INVENTION

The object of the invention is to provide a welding device of the above-named type which is suitable both for stationary as well as movable use. For the solution of this problem it is suggested by the invention that the wire storage device or the wire reel and the wire advance device be arranged separately inside or outside the current source according to choice.

This can be achieved in a simple manner, for example by corresponding releasable fastening means within the welding current source. In arranging the wire storage device and the wire advance device within the current source, the apparatus is suitable for stationary operation. By releasing the fastening means and taking out of both devices, the same apparatus can then simply and quickly be prepared for movable use. In the latter instance, it is suitable to have the wire storage and wire advance devices arranged at a distance from the current source on a conveyable cart.

For movable application, for example at construction sites, it is suggested, on the contrary, to leave the wire storage device within the welding current source and to arrange the wire advance device to be portable in a boxlike container.

With such reequipped apparatus for movable operation, one can work at distances of up to 10 m. from the current source. An enlargement of this work radius can furthermore be achieved in that the wire advance device would have connected to it a second wire advance device. Here it is again possible to leave the first wire advance device together with the wire storage device either within the welding current source or to arrange them outside the same. It is thus possible to bridge over distances from the current source of up to about 25 m.

The second wire advance device can be arranged in a stationary or movable manner outside the current source. However, it is particularly suitable if the second wire advance device were arranged in a manner known per se within the welding torch.

THE DRAWINGS

The invention is explained in more detail in the drawings and the following disclosure. There is shown in schematic form:

FIG. 1 shows a welding apparatus with built-in wire storage device and a wire advance device;

FIG. 2 shows a welding apparatus with the wire storage and wire advance devices arranged outside the current source;

FIG. 3 shows a welding apparatus similar to FIG. 1 with an additional wire advance device;

FIG. 4 shows a combination of the devices of FIGS. 2 and 3;

FIG. 5 shows the device according to FIG. 1 with an additional wire advance device built into the torch; and FIG. 6 shows a welding apparatus with wire storage device arranged outside the current source and first wire storage device with additional second wire advance device.

DETAILED DESCRIPTION

The current source housing constructed similarly in the devices according to FIGS. 1 to 6 and designated with 10 is divided by a separating wall 11 into a lower part 12 and an upper part 13. The lower part 12 contains the nonillustrated control elements, as well as the cooling system, while the upper part 13 serves for receiving a wire storage device 14 and a wire advance device 15. In the devices of FIGS. 1, 3 and 5 the storage and advances devices 14, 15 are also arranged there. A hose set leading from the wire advance device 15 to torch 16 or 17 (FIGS. 5 and 6) is designated with 18 in FIGS. 1 and 2. Hose 18 may have approximately a length of 3 m. The device of FIG. 1 is therefore essentially suited for stationary operation only.

In the device of FIG. 2, wire storage and advance devices (14 and 15, respectively) are arranged outside the current source 10 and specifically on a cart 19. The latter consists of a tubular frame 20 which runs on wheels 21 by releasable fastening means schematically illustrated as 42, 44. Device 15 is mounted in a boxlike housing 40. The length of an electric control 22, up to the cart amounts to about 5 m., so that with the arrangement according to FIG. 2, a working radius of about 8 m. is achieved.

In the devices of FIGS. 3 and 5, wire storage device 14 and wire advance device 15 are again arranged within the current source 10. However, a second advance device 23 (FIG. 3) is set up to be stationary. According to FIGS. 5 and 6, the second advance device 24 within torch 17 is movably arranged with it. The hose set, which consequently can achieve a length of about 23 m., is constructed in divided form according to the design of FIG. 3 and is designated with 25, while according to FIGS. 5 and 6 it has — divided — the reference numeral 26.

With the arrangement according to FIG. 4, which to a certain extend represents a combination of the designs of FIGS. 2 and 3, it is possible to achieve an enlargement of the work radius by another 5 m., i.e. up to about 28 m. The same holds true for the design of FIG. 6, a combination of the designs of FIGS. 2 and 5, with the difference that wire storage device 14 and wire advance 15 are set up stationarily. With this design there is furthermore given a mobility of the wire advance device 15 as compared to the wire storage device 14, the advance device 15 being constructed to the portable.

FIG. 1 schematically illustrates any suitable releasable fastening means 36, 38 for removably mounting the storage reel 14 and advance device 15 to the common support or current source housing 10.

What is claimed is:

1. In an apparatus for manual arc welding with a consumable wire electrode including a welding torch, a current source, a wire storage device and a wire advancing device said current source being electrically connected to said advancing device to control its operation thereof and said storage device supplying the wire to said torch through said advancing device, with the welding site being capable of being selectively remote from and adjacent to the current source and wire storage device or wire advancing device, the improvement comprising a housing, said current source being mounted in said housing, first releasable fastening means for removable fastening said wire storage device to said housing whereby said wire storage device may be selectively mounted to said housing adjacent said current source and alternatively disposed remote from said current source, and second releasable fastening means for removably fastening said wire advancing device to said housing whereby said wire advancing device may be selectively mounted to said housing adjacent said current source and alternatively be disposed remote from said current source.

2. The apparatus of claim 11 including a conveyable cart disposed remote from said current source housing, and said wire storage device and said wire advance device being removable mounted on said cart when removed from said housing.

3. The apparatus of claim 2 wherein said wire advance device is portably arranged in a boxlike container.

4. The apparatus of claim 3 including a second wire advance device connected to said wire advance device.

5. The apparatus of claim 4 wherein said second wire advance device is disposed within said welding torch.

6. The apparatus of claim 11 wherein said wire advance device is portably arranged in a boxlike conveyor when removed from said housing.

7. The apparatus of claim 6 including a second wire advance device connected to said wire advance device.

8. The apparatus of claim 7 wherein said second wire advance device is disposed within said welding torch.

9. The apparatus of claim 11 including a second wire advance device connected to said wire advance device.

10. The apparatus of claim 9 wherein said second wire device is disposed within said welding torch.

* * * * *

UNITED STATES PATENT OFFICE
CERTIFICATE OF CORRECTION

Patent No. 3,619,553    Dated November 9, 1971

Inventor(s) Gunter Wilkens et al

It is certified that error appears in the above-identified patent and that said Letters Patent are hereby corrected as shown below:

Claim 1, lines 3, 4, 6, 9, 16 and 17

"advancing" should be --- advance ---

Claim 2, line 1; claim 6, line 1; claim 9, line 1 "11" should be --- 1 ---

Signed and sealed this 2nd day of May 1972.

(SEAL)
Attest:

EDWARD M. FLETCHER, JR.
Attesting Officer

ROBERT GOTTSCHALK
Commissioner of Patents